United States Patent [19]

Tomita

[11] Patent Number: 5,443,552
[45] Date of Patent: Aug. 22, 1995

[54] ELECTROMAGNETIC FLOWMETER AND METHOD FOR ELECTROMAGNETICALLY MEASURING FLOW RATE

[75] Inventor: Toyofumi Tomita, Tokyo, Japan

[73] Assignee: Kabushiki Kaisha Toshiba, Kawasaki, Japan

[21] Appl. No.: 262,877

[22] Filed: Jun. 21, 1994

[30] Foreign Application Priority Data

Jun. 21, 1993 [JP] Japan .................. 5-148976

[51] Int. Cl.$^6$ ................................. G01F 1/00
[52] U.S. Cl. ..................... 73/861.17; 73/861.15
[58] Field of Search ........... 73/861.11, 861.12, 861.13, 73/861.16, 861.17

[56] References Cited

U.S. PATENT DOCUMENTS

| | | | |
|---|---|---|---|
| 3,783,687 | 1/1974 | Mannherz et al. | 73/861.17 |
| 3,965,738 | 6/1976 | Watanabe | 73/861.17 |
| 4,010,644 | 3/1977 | Bonfig et al. | |
| 4,373,400 | 2/1983 | Sekiguchi | 73/861.12 |
| 4,644,799 | 2/1987 | Tomita et al. | 73/861.12 |
| 4,709,583 | 12/1987 | De Paepe et al. | 73/861.17 |
| 4,856,345 | 8/1989 | Mochizucki | 73/861.17 |

FOREIGN PATENT DOCUMENTS 0225229 6/1987 European Pat. Off. .
216852 4/1990 Japan .

Primary Examiner—Richard E. Chilcot, Jr.
Assistant Examiner—R. Biegel
Attorney, Agent, or Firm—Oblon, Spivak, McClelland, Maier, & Neustadt

[57] ABSTRACT

An electromagnetic flowmeter comprises a measurement tube through which a fluid flows the rate of flow of which is to be measured, a plurality of electrodes disposed on the inner wall of the measurement tube to face each other, excitation coils for applying a magnetic field to the inside of the measurement tube in a direction orthogonal to the axis of the tube, an excitation circuit for supplying the excitation coils with a rectangular excitation current in at least two excitation cycles, a flow-rate value calculating circuit for, when electromotive force is generated between the electrodes in each of the excitation cycles, extrapolating flow-rate signals based on the electromotive force generated during the excitation cycles to obtain a flow-rate value signal that would be obtained when the excitation cycles are made infinitely large, and a flow-rate value output circuit for outputting the flow-rate value signal obtained by the flow-rate value calculating circuit through extrapolation.

19 Claims, 7 Drawing Sheets

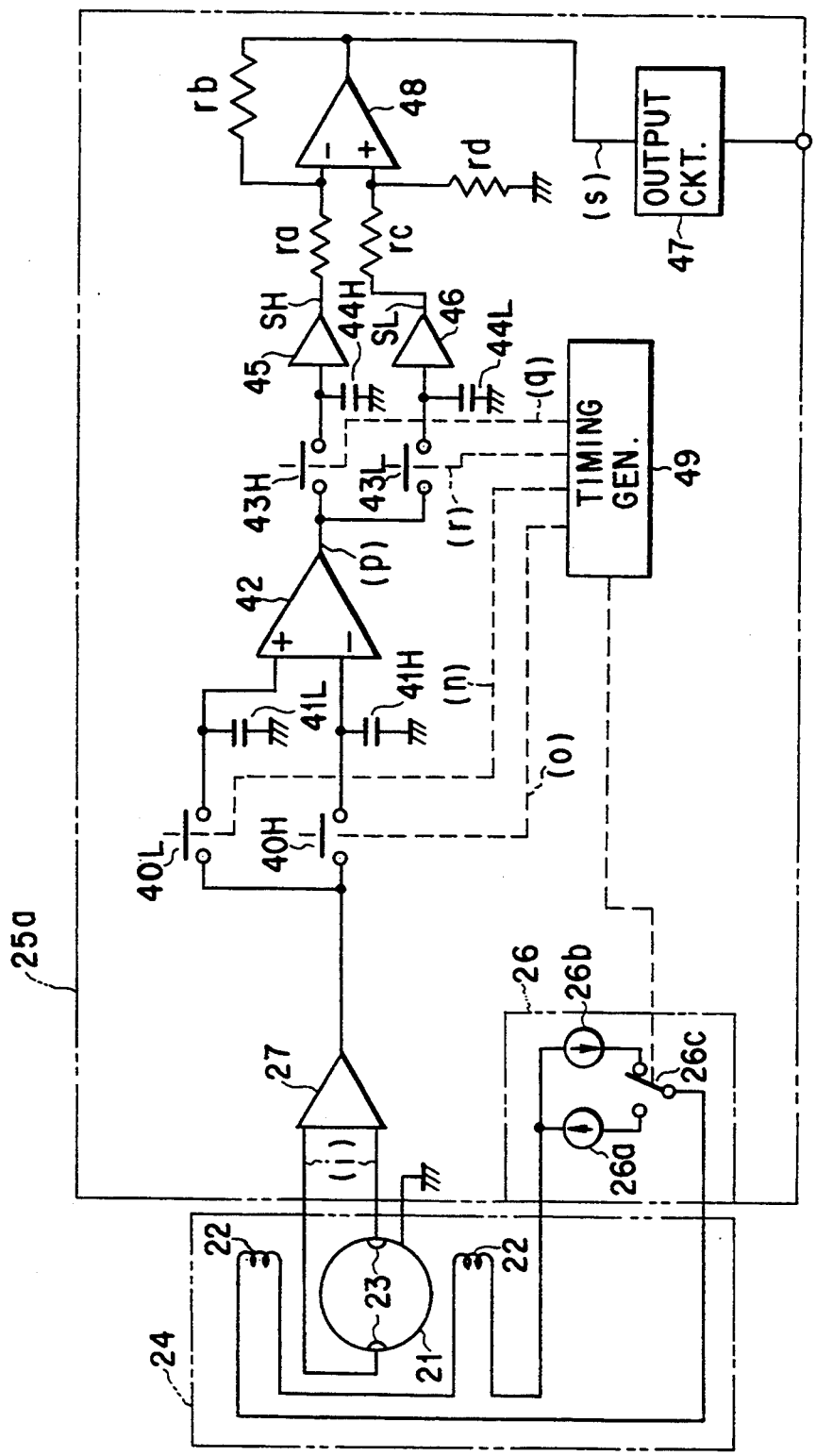
F I G. 5

ELECTROMAGNETIC FLOWMETER AND METHOD FOR ELECTROMAGNETICALLY MEASURING FLOW RATE

BACKGROUND OF THE INVENTION

1. Field of the Invention

The present invention relates to an electromagnetic flowmeter and an electromagnetic flow-rate measuring method for measuring the rate of flow of a conductive fluid, and more particularly to an electromagnetic flowmeter for minimizing measurement errors due to induced noise without making zero-point adjustments that involve stopping the flow of a fluid the rate of flow of which is to be measured to thereby provide a significant improvement in measurement precision and a method therefor.

2. Description of the Related Art

In general, an electromagnetic flowmeter is arranged to apply an electromagnetic field in a direction orthogonal to a conductive fluid flowing through a measurement tube, detect electromotive force electromagnetically induced in the fluid by using two electrodes inside the tube, and convert it to a value corresponding to the rate of flow of the fluid. In recent electromagnetic flowmeters, a low-frequency exciting type of electromagnetic flowmeter is widely used, which is also called a square-wave exciting type and which is excellent in zero point stability in comparison with an alternating-current, i.e., sine wave, exciting type and a direct-current, i.e., constant current, exciting type.

In a low-frequency exciting type of electromagnetic flowmeter, an exciting current flowing through an exciting coil is switched between two fixed values periodically, i.e., the polarity of the excitation current is changed periodically, and electromotive force generated between the two electrodes inside the tube is amplified and sampled when the exciting current becomes each of the fixed values once. By producing the difference between successive sampled values, a flow rate value can be obtained which is free of two kinds of noise: a DC noise caused by an offset voltage of an amplifier or an electrochemical phenomenon on surfaces of the electrodes, and other is an electromagnetically induced noise induced by the link between an exciting coil and a loop which is composed of the electrodes, fluid and the amplifier.

However, a problem with such a low-frequency exciting type of electromagnetic flowmeter is that the zero point drifts to produce an error in flow rate measurement unless electromotive force between the electrodes is sampled after a lapse of a sufficient length of time since the exciting current has reached a fixed value. Making the switching period of the exciting current so long as to stabilize the zero point would prolong the time interval for obtaining the flow rate signal, resulting in poor responsiveness.

To stabilize the zero point, such a novel electromagnetic flowmeter as disclosed in Japanese Unexamined Patent Publication No. 2-16852 was devised. FIG. 10 is a block diagram of this electromagnetic flowmeter, and FIG. 11 is a timing diagram illustrating its operation. The flowmeter comprises an excitation circuit 1 for supplying an excitation current, an electromagnetic flowmeter transmitter 2 responsive to the exciting current from the excitation circuit 1 to produce electromotive force $e_a$ proportional to the rate of flow of the fluid, and a signal processing circuit 3 for obtaining a flow rate value corresponding to the electromotive force $e_a$.

In the excitation circuit 1, a constant current source 4 produces a constant current and switches 5a and 5b are respectively responsive to pulses P1a and P1b shown at (a) and (b) in FIG. 11 to vary the polarity of the constant current from the constant current source 4 in the order zero, negative, and positive and supply the constant current of varying polarity to an excitation coil 6 in the electromagnetic flowmeter transmitter 2.

In the electromagnetic flowmeter transmitter 2, the exciting coil 6 is responsive to application of an exciting current Iw (shown at [c] in FIG. 11) from the exciting circuit 1 to produce a magnetic field that is applied to a measurement tube 7 in a direction orthogonal to its axis. Two electrodes 8a and 8b disposed on the inner wall of the tube apply electromotive force $e_a$ induced in the fluid by that magnetic field as shown at (d) in FIG. 11 to an AC amplifier 9 in the signal processing circuit 3.

In the signal processing circuit 3, the AC amplifier 9 amplifies the electromotive force $e_a$ detected by the electrodes 8a and 8b, and a switch 10 samples the amplified output twice during the time interval when the excitation current is zero and once during the time interval when the exciting current is positive or negative in accordance with the timing of sampling pulses P2 shown at (e) in FIG. 12. Each of the resulting samples is applied to an analog-to-digital (A/D) converter 11 in sequence.

The A/D converter 11 converts each of the samples to a digital form and applies it to a microprocessor 12.

The microprocessor 12 performs calculations on these digital samples to remove an offset voltage component Vf and a noise component Vn from the electromotive force, thereby obtaining signal components Vs1 and Vs2 proportional to only the flow rate of fluid. The signal components Vs1 and Vs2 are applied to a digital-to-analog (D/A) converter 13. The microprocessor 12 has functions of providing the pulses P1a and P1b to the switches 5a and 5b, the pulses P2 to the sampling switch 10, and control pulses P3 to a sample and hold circuit 14 following the D/A converter 13.

The D/A converter 13 converts the results of calculations by the microprocessor 12 to analog signals which are in turn applied to the sample and hold circuit 14. The sample and hold circuit 14 samples and holds the analog signals at the times of the pulses P3 shown at (f) in FIG. 11 to produce output voltages $e_0$.

Thus, this type of electromagnetic flowmeter compensates for the difference between a noise component when the exciting current is positive or negative and a noise component when the excitation current is zero to effectively remove noise components which cause the zero drift, thereby stabilizing the zero point while preventing the responsibility from lowering without making the switching interval long.

In the electromagnetic flowmeter, however, one sampling time has to be very short because sampling is performed twice during a time interval when the excitation current is zero and once during a time interval when the excitation current is positive or negative. Thus, the measurement is subject to the influence of bubbles or solid material in the fluid during sampling, which will decrease the reliability of measurement.

On the other hand, making the sampling time for electromotive force $e_a$ produced between the electrodes so long as to circumvent the influence of such bubbles and solid material would require a long excitation period or cycle which results in poor responsiveness. Moreover, slurry fluids, such as pulp liquid, have 1/F characteristics in which the lower the noise frequency, the higher the noise level becomes. Thus, the signal-to-noise ratio deteriorates as the excitation cycle increases, that is, the excitation frequency decreases.

SUMMARY OF THE INVENTION

It is therefore a first object of the present invention to provide an electromagnetic flowmeter and an electromagnetic flow-rate measuring method which permit errors in measurement due to induced noise to be eliminated without making zero point adjustments involving stopping the flow of a fluid the rate of flow of which is to be measured.

It is a second object of the present invention to provide an electromagnetic flowmeter and an electromagnetic flow-rate measuring method which permit a relatively long sampling time to be set to thereby circumvent the influence of bubbles and solid material in the fluid and increase reliability.

To attain the above objects, an electromagnetic flowmeter of the present invention, which comprises a measurement tube through which a fluid flows the rate of flow of which is to be measured, a plurality of electrodes disposed on the inner wall of the measurement tube to face each other, and excitation coils for applying a magnetic field to the inside of the measurement tube in a direction orthogonal to the axis of the tube, is characterized by further comprising an excitation circuit for supplying the excitation coils with a rectangular current that is selectively switched between at least two excitation cycles, a flow-rate value calculation circuit for obtaining a flow-rate value signal that would be obtained when the excitation cycle is made infinitely long from flow-rate signals for the respective excitation cycles obtained from electromotive force induced in the fluid and detected by the electrodes by means of extrapolation of the flow-rate signals, and a flow-rate value output circuit for outputting the flow-rate value signal obtained by the flow-rate value calculation circuit.

It is well known that when the excitation cycle for the excitation coils is made longer, the excitation current becomes more stable and hence errors are difficult to occur in the flow-rate signals. Also, it is well known that when the excitation cycle is made longer, the responsiveness becomes lower and hunting is liable to occur.

In the invention, the flow-rate value calculation circuit obtains a flow-rate value signal, which corresponds to that when the excitation cycle is made infinitely long, from flow-rate signals for different excitation cycles, thus preventing the responsiveness from lowering and eliminating measurement errors due to induced noise without making zero point adjustments that involve the stopping of flow of the fluid.

Further, the present invention simply samples the flow-rate signal with each excitation cycle, which permits a long sampling time to be employed, making it difficult to undergo the influence of bubbles and solid material in the fluid.

In the electromagnetic flowmeter, the excitation circuit supplies the excitation coils with a rectangular current of alternate first and second excitation frequencies $fH$ and $fL$, and upon detecting a first flow-rate signal $SH$ for the first excitation frequency $fH$ and a second flow-rate signal $SL$ for the second excitation frequency $fL$, the flow-rate value calculation circuit may calculate the flow-rate value $V$ in accordance with either of the following equations:

$$V = SL \times fH/(fH - fL) - SH = fL/(fH - fL)$$

$$V = SL \times fH^2/(fH^2 - fL^2) - SH \times fL^2/(fH^2 - fL^2)$$

Thus, the employment of only two excitation frequencies permits the electromagnetic flowmeter to be made simple in construction.

The flow-rate value calculation circuit may obtain the average $SHa$ of first flow-rate signals $SH$ for the first excitation frequency $fH$ and the average $SLa$ of second flow-rate signals $SL$ for the second excitation frequency $fL$. When the circuit receives a first flow-rate signal $SH$ after the calculation of the averages $SHa$ and $SLa$, it calculates $V$ in accordance with the following equation:

$$V = (SLa - SHa) \times fH/(fH - fL) + SH$$

When the circuit receives a second flow-rate signal $SLa$ after the calculation of the averages $SHa$ and $SLa$, it calculates $V$ in accordance with the following equation:

$$V = (SLa - SHa) \times fL/(fH - fL) + SL$$

Thus, the use of average values permits a further improvement in reliability.

In the event that the magnitude of the induced noise is great, the average-based equations may be modified as follows:

$$V = (SLa - SHa) \times fH^2/(fH^2 - fL^2) + SH$$

$$V = (Sla - SHa) \times fL^2/(fH^2 - fL^2) + SL$$

Another electromagnetic flowmeter of the present invention, which comprises a measurement tube through which a fluid flows the rate of flow of which is to be measured; a plurality of electrodes disposed on the inner wall of the measurement tube to face each other; and excitation coils for applying a magnetic field to the inside of the measurement tube in a direction orthogonal to the axis of the tube, is characterized by further comprising an excitation circuit for supplying the excitation coils with a rectangular excitation current that is selectively switched between at least two excitation cycles; a flow-rate signal producing circuit responsive to electromotive force induced in the fluid and detected by the electrodes for producing a flow-rate signal for each of the excitation cycles; an excitation current detecting circuit for detecting the excitation current flowing through the excitation coils at a preselected rise time; a flow-rate value calculating circuit for making a comparison between an excitation current detected by the excitation current detecting circuit and a predetermined reference current value to decide whether or not the excitation current has reached the predetermined reference current value during the rise time interval, and obtaining a flow-rate value signal that would corresponds to that when the excitation cycle is made infinite from flow-rate signals produced by the flow-rate signal producing circuit by means of either extrapolation based on a linear function of excitation cycle when the decision is that the excitation current has reached the reference current value or extrapolation based on a quadratic function of excitation cycle when the decision is that the excitation current has not reached the reference current value; and a flow-rate value output circuit for outputting the flow-rate value signal obtained by the flow-rate value calculating circuit.

In this way, the flow-rate value calculating circuit selects between functions for extrapolating the flow-rate signals, depending on how the excitation current rises during the preselected rise time interval, thus improving extrapolation precision. This offers a further improvement in measurement precision.

According to the present invention, a flow-rate value signal that would correspond to that when the excitation cycle is infinitely large is obtained from flow-rate signals for different excitation cycles, thus eliminating measurement errors due to induced noise without making zero point adjustments that involve stopping of the flow of the fluid and improving measurement precision. In addition, a long sampling time is allowed, which makes it difficult to undergo the influence of bubbles and solid material in the fluid and provides improved reliability.

BRIEF DESCRIPTION OF THE DRAWINGS

FIG. 2 shows at (g), (h), (i), (j), (k), (l), and (m) an excitation current waveform, a magnetic field waveform, an electromotive force waveform, an induced noise waveform, a timing signal, a sampled signal, and primary flow-rate signals, respectively;

FIG. 5 shows an arrangement of an analog electromagnetic flowmeter according to a fourth embodiment of the present invention;

FIG. 6 shows at (n), (o), (q) and (r) the timing of opening and closing the switches, and FIG. 6 shows at (p) and (s) outputs of the differential amplifier and the operational amplifier of FIG. 5, respectively;

FIG. 9 shows at (t) the timing of connection to the excitation current detecting line and at (u) an output waveform of the A/D converter of FIG. 8;

FIG. 11 shows at (a) and (b) the timing of excitation current switching pulses, and FIG. 11 shows at (c), (d), (e) and (f) an excitation current waveform, an electromotive force waveform, sampling pulses and sample-and-hold pulses, respectively.

DETAILED DESCRIPTION OF THE PREFERRED EMBODIMENTS

Figure 1:
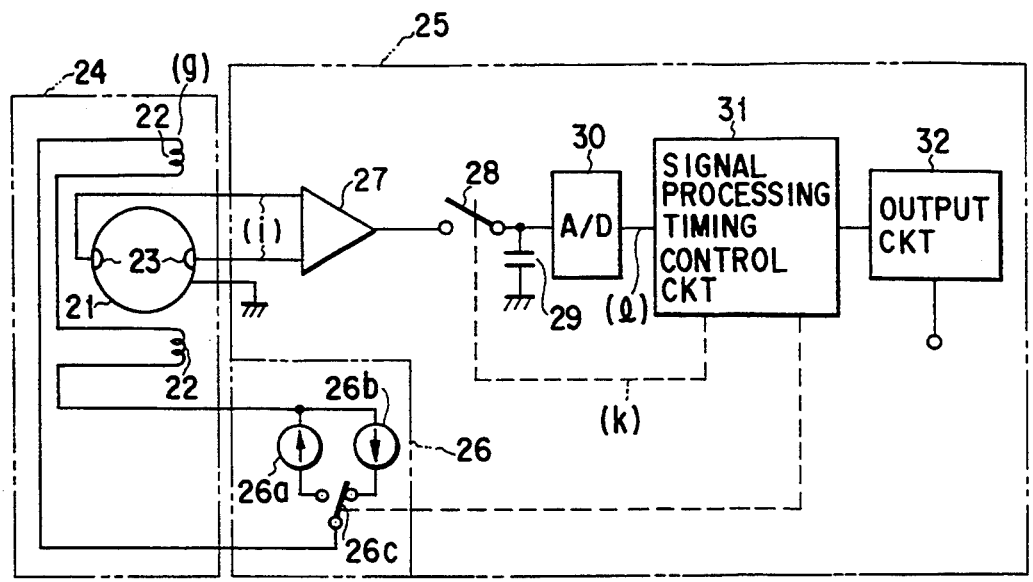
FIG. 1 illustrates an arrangement of an electromagnetic flowmeter according to a first embodiment of the present invention.
Figure 3:
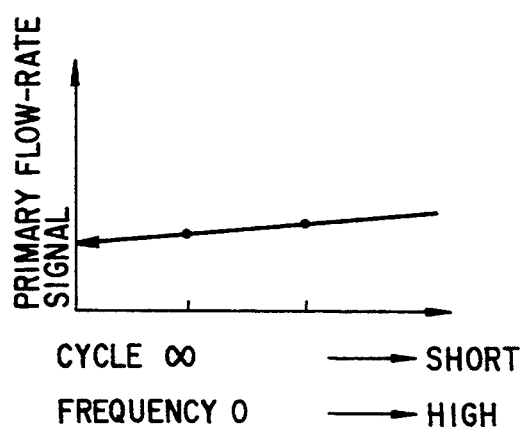
FIG. 3 is a diagram for use in explanation of extrapolation based on linear approximation used in the instrument of FIG. 1.

Referring now to FIG. 1, there is illustrated an electromagnetic flowmeter according to a first embodiment of the present invention, which comprises a measurement tube 21 through which a conductive fluid flows, the rate of flow of which is to be measured, excitation coils 22 for applying a magnetic field to the measurement tube in a direction orthogonal to the axis of the tube, and a detector 24 composed of two electrodes 23 which are disposed on the inner wall of the measurement tube to face each other in a direction orthogonal to the magnetic field. The detector 24 is connected to a converter 25 with control functions.

The converter 25 with control functions is arranged to excite the excitation coils 22 in any of a plurality of excitation cycles and extract electromotive force obtained from the electrodes 23 at any times for subsequent data processing. More specifically, the converter 25 is equipped with an excitation circuit 26, a preamplifier 27, a sampling switch 28, a capacitor 29, an A/D converter 30, a signal processing timing control circuit 31, and an output circuit 32.

The excitation circuit 12 comprises constant current sources 26a and 26b of opposite polarity, and an excitation change-over switch 26c for connecting either of the current sources to the excitation coils 22. By the switch 26c being changed over by an excitation change-over signal from the signal processing timing control circuit 31, the excitation circuit 12 performs a function of exciting the coils 22 in any of a plurality of excitation cycles.

The preamplifier 27 amplifies electromotive force detected by the electrodes 23 and sends an amplified signal to the sampling switch 28.

The sampling switch 28 forms a sample and hold circuit together with the succeeding capacitor 29. By being opened or closed by a timing signal from the signal processing timing control circuit 31, the switch 28 performs a function of extracting an output signal of the preamplifier 27 at any time and sending extracted samples to the A/D converter 30.

The A/D converter 30 has a function of converting each sample from the sample and hold circuit to a digital form and sending a resulting digitized sample to the signal processing timing control circuit 31.

The signal processing timing control circuit 31, which has a microcomputer not shown, performs functions of sending an excitation control signal to the excitation change-over switch 26c in a predetermined excitation cycle to thereby control the excitation circuit 26 and sending a timing signal to the sampling switch 28 at predetermined times to thereby control the sample and hold circuit. The signal processing timing control circuit 31 has also a function of performing arithmetic on samples from the A/D converter 30 and sending the results to the output circuit 32.

The output circuit 32 provides the results of arithmetic from the signal processing timing control circuit 31 as an output of the flowmeter.

The operation of the above electromagnetic flowmeter will now be described with reference to the timing chart shown in FIG. 2.

Suppose now that a fluid is flowing through the measurement tube 21 at a constant rate of flow.

The signal processing timing control circuit 31 of the converter 25 applies an excitation change-over signal alternating between a long excitation cycle and a short excitation cycle to the switch 26c of the excitation circuit 26. In response to this, the excitation circuit 26 applies square-wave currents of long and short cycles to the excitation coils 22 of the detector 24.

Figure 2:
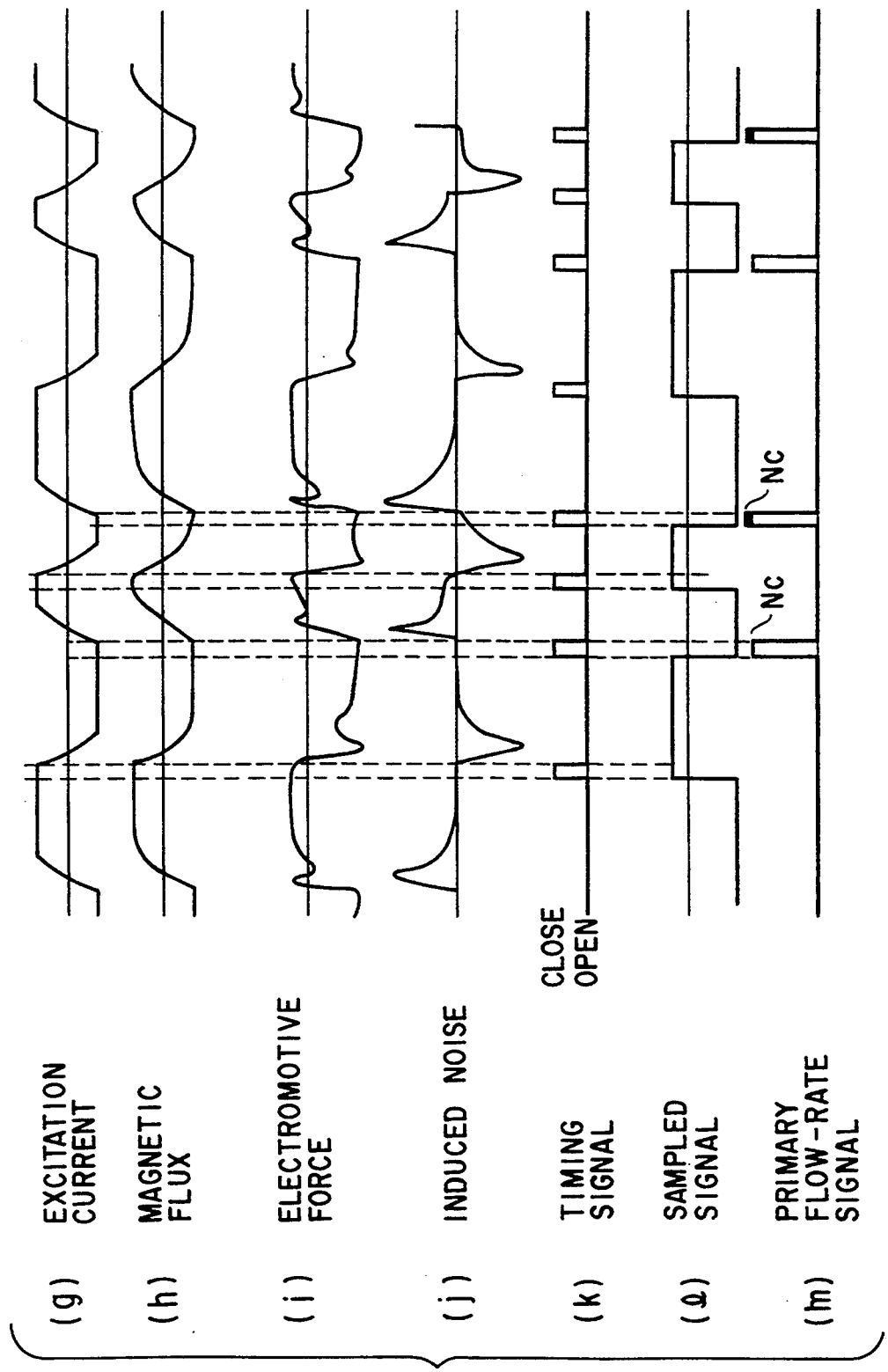
FIG. 2 is a timing diagram for use in explanation of the operation of the instrument shown in FIG. 1, more specifically.

At this point, an excitation current flows through the excitation coils 26, which becomes constant after a delay of a predetermined time from the polarity change as shown at (g) in FIG. 2 because each of the coils has an inductance and each of the constant current sources 26a and 26b has a fixed output voltage. As a result, such a magnetic field as indicated by the magnetic fluxes shown at (h) in FIG. 2 is produced.

This magnetic field produces electromotive force in the fluid as shown at (i) in FIG. 2, which is detected by the electrodes. Note that the magnetic field undergoes the influence of eddy current flowing through the detector, so that some delay occurs between the moment that the excitation current becomes constant in magnitude and the moment that the magnetic field becomes constant.

Before the magnetic field stabilizes, induced noise which is due to changes in the magnetic field and which includes DC noise is produced in a conductive loop formed of the two inputs of the preamplifier 27, the electrodes 23 and the conductive fluid as shown at (j) in FIG. 2. That induced noise is superimposed upon the electromotive force between the electrodes 23. It should be noted that the DC noise is generated on the electrodes 23.

The electromotive force detected by the electrodes 23 is amplified by the preamplifier 27 and then sent to the sampling switch 28 as an electromotive force amplified signal. Meanwhile, the signal processing timing control circuit 31 issues a timing signal to the sampling switch 28 as shown at (k) in FIG. 2 after a lapse of a predetermined time from the transmission of the excitation change-over signal to the time when the electromotive force between the electrodes 23 has become constant in magnitude.

In response to the timing signal, the sampling switch 28 is placed in the closed position for a predetermined time interval immediately before the polarity of the excitation current is changed in each excitation cycle, during which time the capacitor 29 is charged to a level of the electromotive force amplified signal. That is, during each of the two long and short excitation cycles, sampling is performed twice to extract stable positive and negative levels of the electromotive force amplified signal.

The electromotive force amplified signal thus sampled is converted by the A/D converter 30 to digital samples, which are sent to the signal processing timing control circuit 31 for each polarity of the excitation current in successive excitation cycles.

Upon receipt of the positive and negative samples in each of the long and short excitation cycles, the signal processing timing control circuit 31 performs a primary process of subtracting the negative sample from the positive sample for each excitation cycle by using the microcomputer not shown. As a result, such primary flow-rate signals as shown at (m) in FIG. 2 are obtained.

In the primary flow-rate signals for long and short excitation cycles, very low-frequency noise components have been removed, but induced noise components Nc are contained as indicated in black (m) in FIG. 2. Of these primary flow-rate signals, the primary flow-rate signal for the long excitation cycle contains less induced noise Nc because the interval in which the magnetic field is kept constant until sampling is performed is long. In other words, the magnitude of the induced noise Nc is in inverse proportion to the excitation cycle or period but in proportion to the excitation frequency.

Next, the signal processing timing control circuit 31 performs extrapolation based on linear approximation on the primary flow-rate signals for long and short excitation cycles to obtain a flow-rate signal that would be obtained when the excitation frequency is zero (a flow-rate value when the excitation cycle is infinite). The flow-rate signal is sent to the output circuit 32. The flow-rate signal when the excitation frequency is zero is free from induced noise Nc and thus indicates a true flow-rate value.

The output circuit 32 provides this flow-rate signal to a recorder by way of example.

In the first embodiment, as described above, the excitation circuit 26 supplies the excitation coils 22 with excitation current alternating between long and short cycles while fluid is flowing through the measurement tube 21 at a fixed rate of flow, the signal processing timing control circuit 31 obtains primary flow-rate signals for each excitation cycle on the basis of electromotive force produced between the electrodes 23 and further obtains a flow-rate signal that would be obtained when the excitation cycle is infinite from the primary flow-rate signals by means of extrapolation, and the output circuit 32 outputs the flow-rate signal obtained by the signal processing timing control circuit 31.

In this way, the present embodiment can obtain a flow-rate signal when the excitation frequency is zero, which is normally impossible to realize, by extrapolating two primary flow-rate signals that contain induced noise in proportion to the excitation frequency when the rate of flow is constant, thus permitting errors in measurement due to induced noise Nc to be eliminated without making zero point adjustments that involve stopping the flow of the fluid and measurement precision to be improved.

Moreover, it is simply required to sample electromotive force for each polarity of an alternating excitation current. As opposed to the prior art, therefore, it becomes unnecessary to perform sampling twice for each polarity of the excitation current. This permits a relatively long sampling time to be taken, making it difficult to undergo the effects of bubbles and solid matter in the fluid.

Furthermore, primary flow-rate signals are obtained through subtraction, which permits direct-current-like low-frequency noise to be eliminated. Thus, the extrapolation can be performed in the state where the signal-to-noise ratio is high.

In addition, the use of linear approximation for the extrapolation is very effective in removing induced noise Nc from the electromotive force between the electrodes 23 if the induced noise is sufficiently small in comparison with the primary flow-rate signals.

Further, even if zero drift occurs due to changes in the conductivity of the fluid, induced noise can be eliminated through the process of producing primary flow-rate signals as long as the flow rate is constant, thus ensuring reliability of the flow-rate measurement.

Next, an electromagnetic flowmeter according to a second embodiment of the present invention will be described. This embodiment allows the signal processing timing control circuit 31 to change the excitation cycle in three steps in order to improve precision in measurement over the first embodiment. The present flowmeter is constructed identical to the flowmeter shown in FIG. 1.

Figure 4:
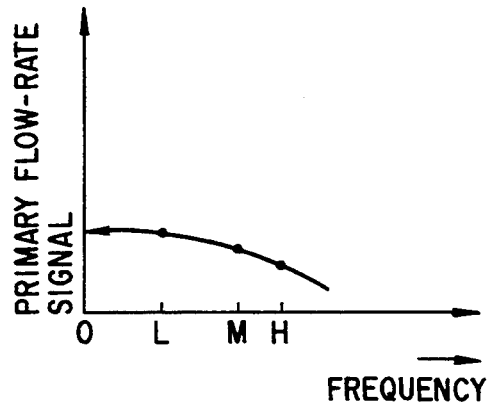
FIG. 4 shows excitation period versus primary flow-rate signal for an electromagnetic flowmeter according to a second embodiment of the present invention in which the excitation cycle is set in three steps.

FIG. 4 shows primary flow-rate signal versus excitation cycle in the case where the excitation cycle is changed in three steps: L (low), M (medium), and H (high). As can be seen, primary flow-rate signals go low as the excitation frequency increases.

Such primary flow-rate signals are produced when induced noise Nc is 180-degree out of phase with flow-rate signals. As opposed to the first embodiment, the more the induced noise, the lower the signal level becomes.

By extrapolating the three primary flow-rate signals, the signal processing timing control circuit 31 obtains a flow-rate signal that would correspond to that obtained when the excitation frequency is zero as described above, which, in turn, is sent to the output circuit 32. The output circuit provides that flow-rate signal to a recorder (not shown) by way of example.

According to the second embodiment, as described above, since the excitation cycle is changed in three steps, the extrapolation can be performed more precisely. In addition to the advantages of the first embodiment, the second embodiment can make flow-rate measurements with high precision even if the induced noise Nc is great in magnitude.

An electromagnetic flowmeter according to a third embodiment of the present invention will be described hereinafter.

In order to improve reliability over the first embodiment, the third embodiment performs statistical processing on primary flow-rate signals obtained by the signal processing timing control circuit 31. The flowmeter of the third embodiment is identical in construction to that of the first embodiment shown in FIG. 1.

Let SH=primary flow-rate signal for a short excitation cycle, fH=excitation frequency corresponding to the short excitation cycle, SL=primary flow-rate signal for a long excitation cycle, fL=excitation frequency corresponding to the long excitation cycle, V=true flow-rate value, and Nc=proportional coefficient of induced noise corresponding to excitation frequency. Then, the following equations will hold.

$$SH = Nc \times fH + V \quad (1)$$

$$SL = Nc \times fL + V \quad (2)$$

Based on primary flow-rate signals SH1, SH2, ..., and SL1, SL2, ... obtained during a time interval when the flow rate is considered constant, the signal processing timing control circuit 31 obtains the average SHa of primary flow-rate signals for the short excitation cycle and the average SLa of primary flow-rate signals for the long excitation cycle.

Also, the signal processing timing control circuit 17 obtains Nc that satisfy equations (1) and (2) on the basis of the averages SHa and SLa as follows:

$$Nc = (SHa - SLa)/(fH - fL) \quad (3)$$

Note that Nc is obtained periodically.

Further, upon receipt of a first primary flow-rate signal SH during the short excitation cycle, the signal processing timing control circuit 31 calculates V in accordance with the equation given by $$V = (SLa - SHa) \times fH/(fH - fL) + SH$$

This equation is obtained from Nc in equation (3) and equation (1).

Likewise, upon receipt of a first primary flow-rate signal SH during the long excitation cycle, the signal processing timing control circuit 31 calculates V in accordance with the equation given by $$V = (SLa - SHa) \times fL/(fH - fL) + SL$$

This equation is likewise obtained from Nc in equation (3) and equation (2).

The signal processing timing control circuit 31 then provides a flow-rate signal indicating the true flow-rate value V to the output circuit 18, which, in turn, sends it to recorder.

According to the third embodiment, as described above, the signal processing timing control circuit 31 uses the average flow-rate signal to calculate the flow-rate value v. Thus, the third embodiment offers a further increase in reliability of the flow-rate value V in addition to the advantages of the first embodiment. In addition, the use of only two excitation frequencies permits the flowmeter to be simple in construction.

Next, an electromagnetic flowmeter according to a fourth embodiment of the present invention will be described with reference to FIG. 5, which illustrates an analog implementation of that flowmeter in detail. In this figure, corresponding parts to those in FIG. 1 are denoted by like reference numerals and their detailed descriptions are omitted here. Only different portions will be described here.

In this flowmeter, the sample and hold circuit, the A/D converter 30, the signal processing timing control circuit 31, and the output circuit 32 are omitted, and instead, analog circuitry is provided to follow the preamplifier 27 to thereby implement the converter 25a with control functions.

In this analog flowmeter, the output terminal of the preamplifier 27 is connected to two sample and hold circuits each composed of a switch 40L (40H) and a capacitor 41L (40H). The sample and hold circuit composed of the switch 40L and the capacitor 41L is connected at its output to the non-inverting input terminal of a differential amplifier 42, while the other sample and hold circuit composed of the switch 40H and the capacitor 41H is connected to the inverting input terminal.

The differential amplifier 42 has its output terminal connected to each of first and second buffer amplifiers 45 and 46 by a respective one of two sample and hold circuits each of which comprises a switch 43H (43L) and a capacitor 44H (44L). The first buffer amplifier 45 has its output terminal connected to an output circuit 47 through a series combination of resistors ra and rb. The connection point between the resistors ra and rb is connected to the inverting input terminal of an operational amplifier 48 the output terminal of which is connected to the output circuit 47. On the other hand, the second buffer amplifier 46 has its output terminal connected to ground through a series combination of resistors rc and rd. The connection point of the resistors rc and rd is connected to the non-inverting input terminal of the operational amplifier 48.

A timing generator 49 is connected to the switches 40L, 40H, 43H and 43L and the excitation change-over switch 26c in the excitation circuit 26. The timing generator 49 controls these switches 40L, 40H, 43H and 43L at the times shown in FIG. 6.

Next, the operation of the electromagnetic flowmeter thus constructed will be described with reference to a timing diagram of FIG. 6.

Suppose now that the fluid is flowing through the measurement tube 1 at a constant rate of flow.

Figure 6:
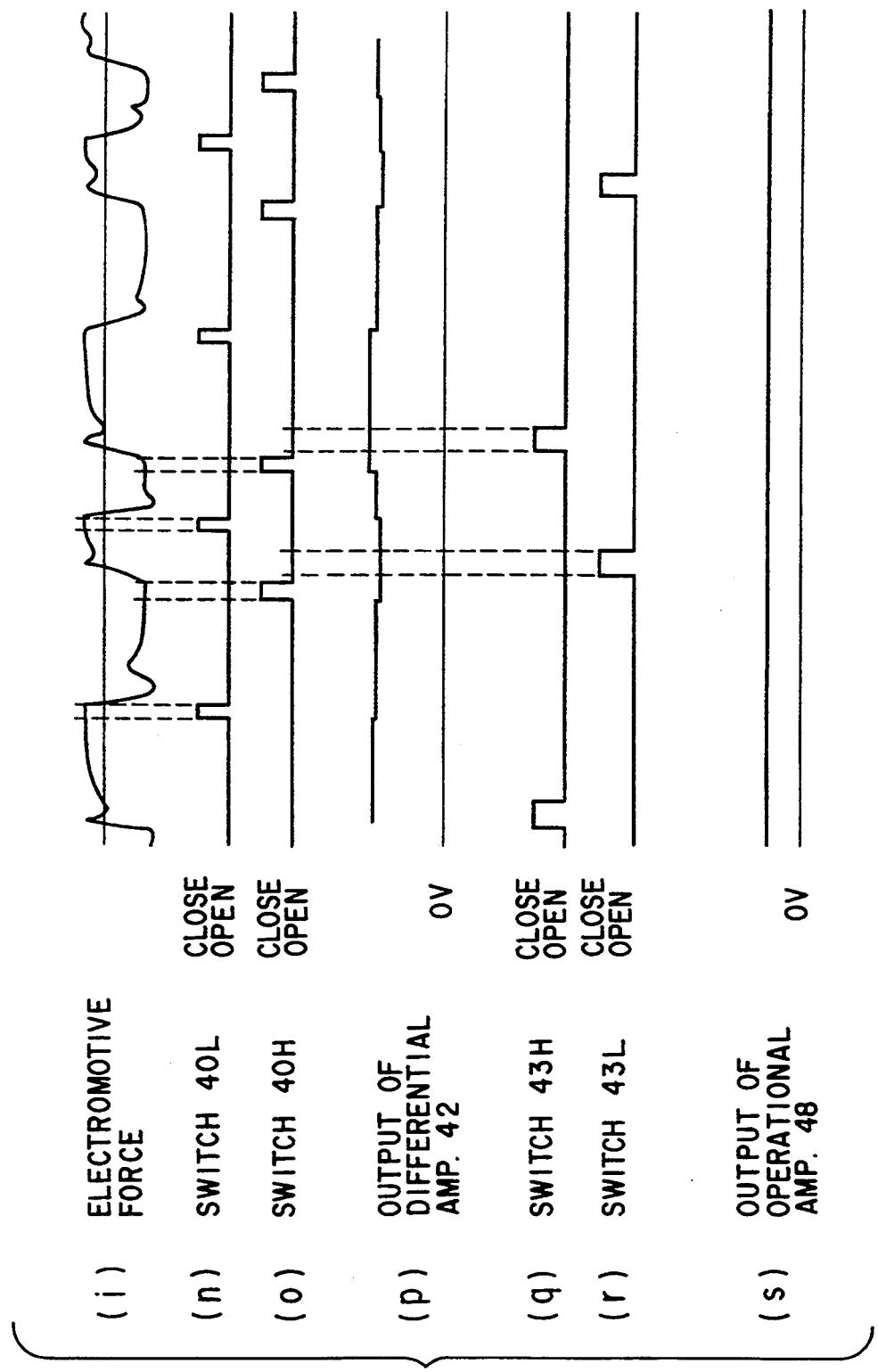
FIG. 6 is a timing diagram for use in explanation of the instrument of FIG. 6, more specifically.

As described previously, electromotive force for each of long and short excitation cycles is developed between the electrodes 23 as shown at (i) in FIG. 6, which appears amplified by the preamplifier 27 at the end of each of the switches 40L and 40H.

The switch 40L is placed in the closed state by the timing generator 49 for a time interval immediately prior to change-over of the excitation polarity, during which time the positive electromotive force is kept stable. Likewise, the switch 40H is placed in the closed state for a time interval immediately prior to change-over of the excitation polarity, during which time the negative electromotive force is kept stable.

That is, the positive electromotive force amplified signal sampled by the switch 40L is applied to the non-inverting input terminal of the differential amplifier 42, while the negative electromotive force amplified signal sampled by the switch 40H is applied to the inverting input terminal of the differential amplifier 42.

Thus, the differential amplifier 42 subtracts the negative electromotive force amplified signal from the positive electromotive force amplified signal with each excitation cycle to thereby apply to each of the switches 43H and 43L a primary flow-rate signal SL after the completion of a long excitation cycle and a primary flow-rate signal SH after the completion of a short excitation cycle as shown at (p) in FIG. 6.

The switch 43H is placed in the closed state by the timing generator 29 only for a time interval after the completion of each short excitation cycle as shown at (q) in FIG. 6, thereby applying the primary flow-rate signal SH through the first buffer amplifier 45 and the resistor ra to the inverting input terminal of the operational amplifier 48. Likewise, the switch 43L is placed in the closed state only for a time interval after the completion of each long excitation cycle as shown at (r) in FIG. 6, so that the primary flow-rate signal SL is applied through the second buffer amplifier 46 and the resistor rc to the non-inverting input terminal of the operational amplifier 48.

The output So of the operational amplifier 48 is represented by $$So = \left(1 + \frac{rb}{ra}\right)\frac{rd}{rc + rd} SL - \frac{rb}{ra} SH \quad (4)$$

Let the coefficients of SL and SH in equation (4) be replaced by k1 and k2, respectively. Then, equation (4) will be rewritten as $$So = k1 \times SL - k2 \times SH \quad (5)$$

Solving equations (1) and (2) for the true flow-rate value V yields $$V = (SL \times fH - SH \times fL)/(fH - fL) \quad (6)$$

It should be noted here that for $So = V$, ra through rd are selected to satisfy $k1 = fH/(fH - fL)$ and $k2 = fL/(fH - fL)$.

Thus, the operational amplifier 48 provides to the output circuit 47 a flow-rate signal indicative of a true flow-rate value V as shown at (s) in FIG. 6. The output circuit 47, in turn, delivers the flow-rate signal to the recorder not shown.

According to the fourth embodiment, as described above, the instrument shown in FIG. 1 is implemented with analog circuitry, which permits a feature of faster signal processing, i.e., faster flow-rate measurement to be added to the advantages of the instrument of FIG. 1.

Next, an electromagnetic flowmeter according to a fifth embodiment of the present invention will be described hereinafter.

The flowmeter of the fifth embodiment differs from the flowmeter of FIG. 1 in the way of performing extrapolation. That is, the present flowmeter obtains a flow-rate signal by extrapolating primary flow-rate signals for long and short excitation cycles on the basis of a parabola as shown in FIG. 7.

Suppose now that when the excitation circuit 26 excites the excitation coils 22, an eddy current flows in the structure of the detector 24 and the fluid to thereby produce synchronous induced noise.

From the fact that the magnitude of the eddy current is proportional to the square of the excitation frequency, it theoretically follows that the induced noise is proportional to the square of the excitation frequency. The more the induced noise increases, the more the primary flow-rate signals containing the induced noise become proportional to the square of the excitation frequency.

Figure 7:
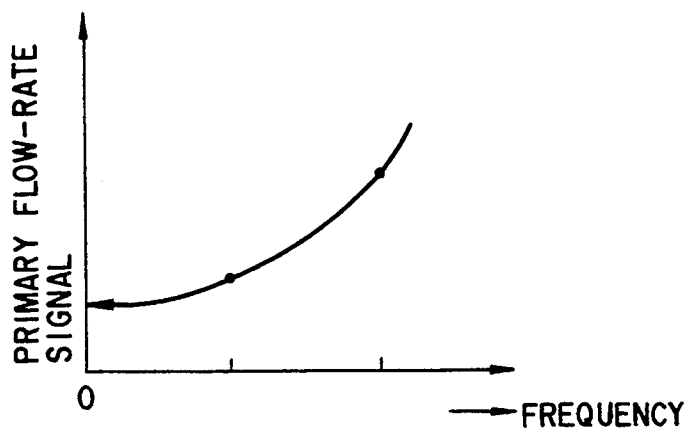
FIG. 7 is a diagram for use in explanation of extrapolation based on a parabola.

The signal processing timing control circuit 31 obtains a flow-rate signal by extrapolating primary flow-rate signals containing induced noise using a parabola as shown in FIG. 7, thereby improving the flowrate measurement precision. As with the previous embodiments, the output circuit 32 provides that flow-rate signal to the recorder not shown.

According to the fifth embodiment, as described above, the signal processing timing control circuit 31 performs parabola-based extrapolation on primary flowrate signals containing induced noise to obtain a flow-rate signal, which is effective in improving the flow-rate measurement precision when the induced noise is produced in large quantities.

Next, an electromagnetic flowmeter according to a sixth embodiment of the present invention will be described hereinafter.

In the present embodiment, which, like the fifth embodiment, assumes that the induced noise is proportional to the square of the excitation frequency, the signal processing timing control circuit 31 obtains a true flow-rate value V by using equations (1)' and (2)' for extrapolation in place of equations (1) and (2) described in connection with the second embodiment.

$$SH \times Nc = fH^2 + V \quad (1)'$$

$$SL \times Nc = fL^2 + V \quad (2)'$$

The signal processing timing control circuit 31 obtains the average SHa of primary flow-rate signals for short excitation cycles and the average SLa of primary flow-rate signals for long excitation cycles from primary flow rate signals SH1, SH2, ..., and SL1, SL2, ... obtained when the rate of flow of the fluid is constant.

Next, the signal processing timing control circuit 31 obtains Nc that satisfies equations (1)' and (2)' according to the equation $$Nc = (SHa - SLa)/(fH - fL) \qquad (3)'$$

Subsequently, upon receipt of a first flow-rate signal SH the signal processing timing control circuit 31 calculates V in accordance with the following equation $$V = (SLa - SHa) \times fH_2/(fH^2 - fL^2)$$

Likewise, upon receipt of a second flow-rate signal SL, the signal processing timing control circuit 31 calculates V in accordance with the equation $$V = (SLa - SHa) \times fL_2/(fH^2 - fL^2) + SL$$

Then, the signal processing timing control circuit 31 delivers the flow-rate value V to the output circuit 32, which in turn provides it to the recorder not shown.

According to the sixth embodiment, as described above, the signal processing timing control circuit 32 performs parabola-based extrapolation using the averages of the primary flow-rate signals, thus ensuring reliability of flow-rate measurement.

Next, a seventh embodiment of the present invention will be described with reference to FIGS. 7 and 8.

Figure 8:
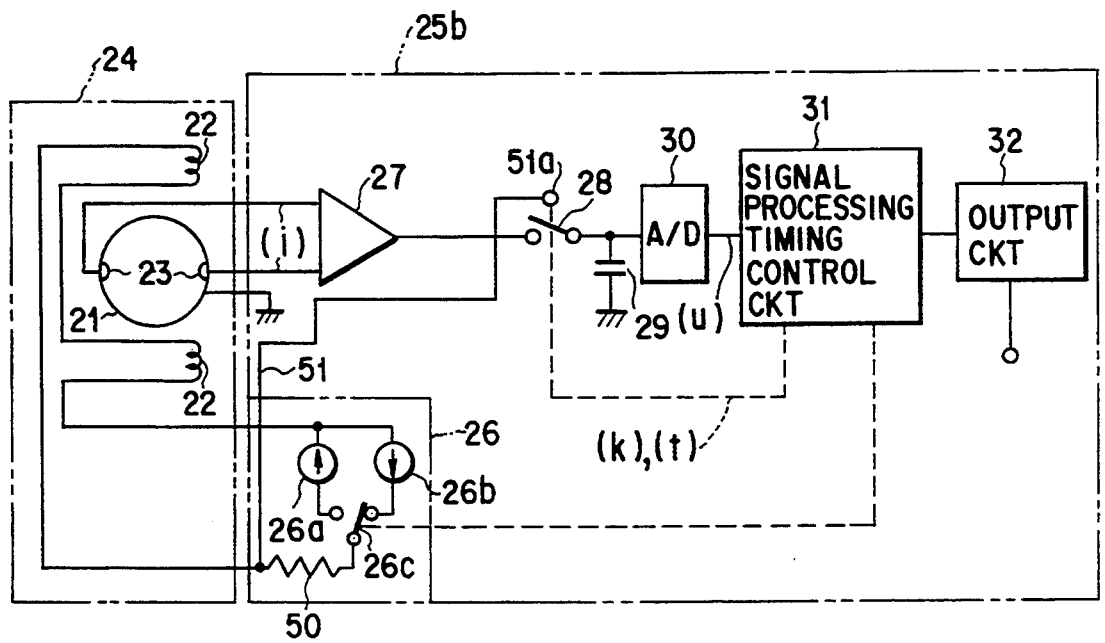
FIG. 8 illustrates an arrangement of an electromagnetic flowmeter according to a seventh embodiment of the present invention.
Figure 9:
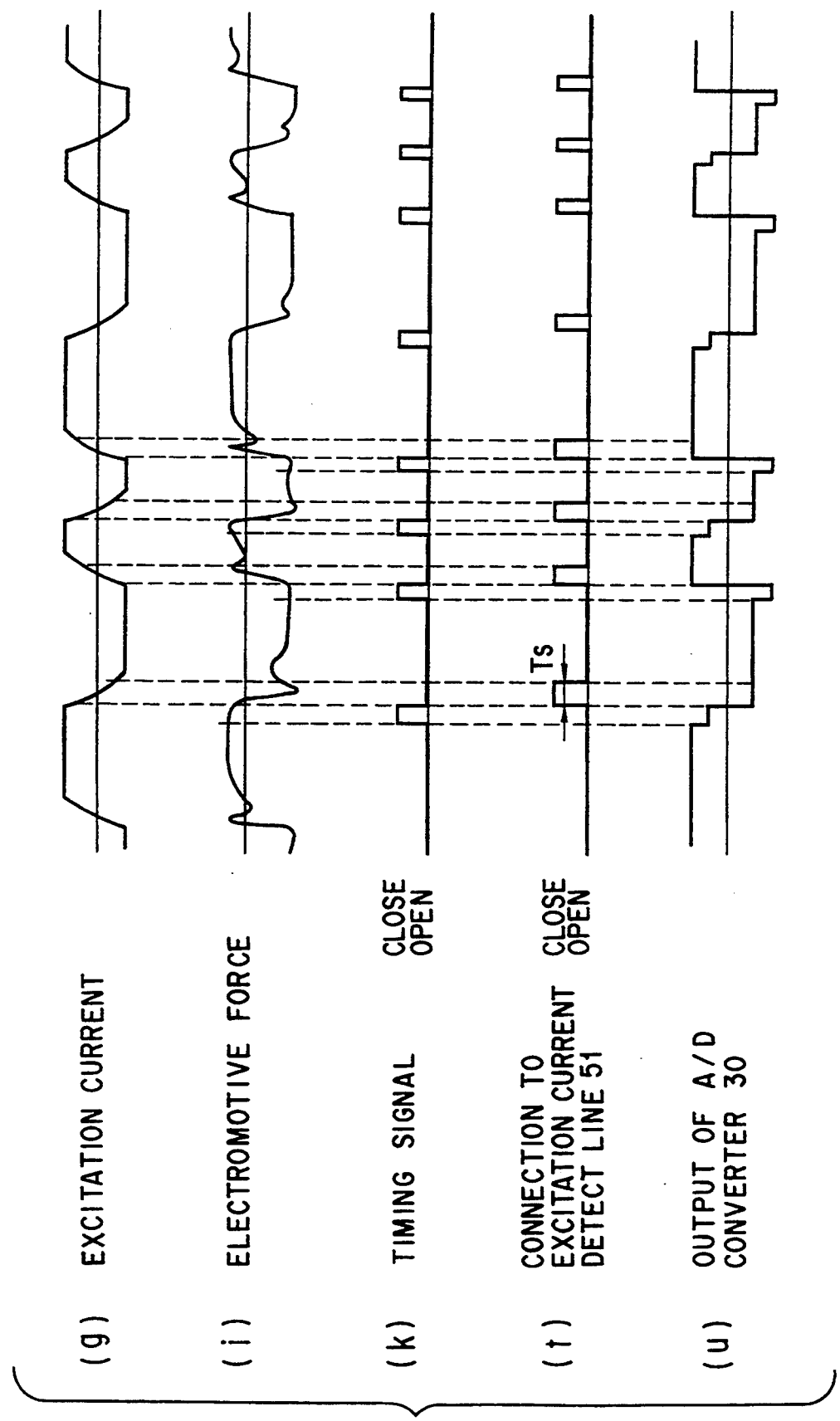
FIG. 9 is a timing diagram for use in explanation of the operation of the electromagnetic flowmeter of FIG. 8, more specifically.
Figure 10:
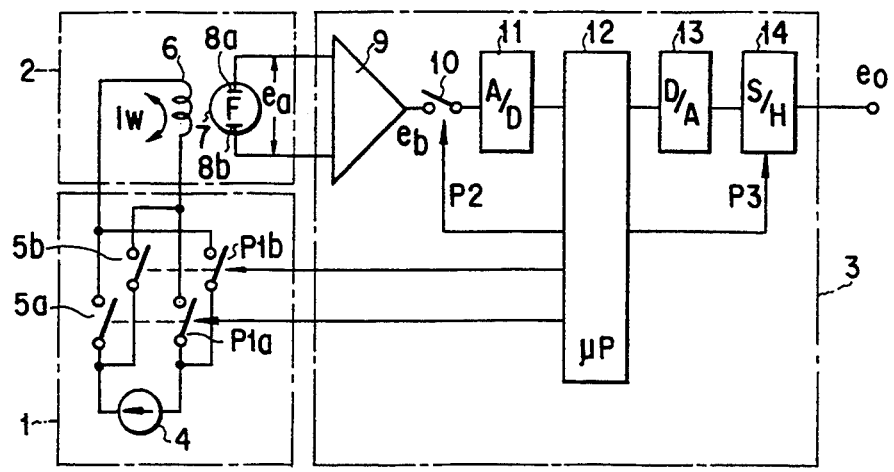
FIG. 10 shows an arrangement of a conventional electromagnetic flowmeter.
Figure 11:
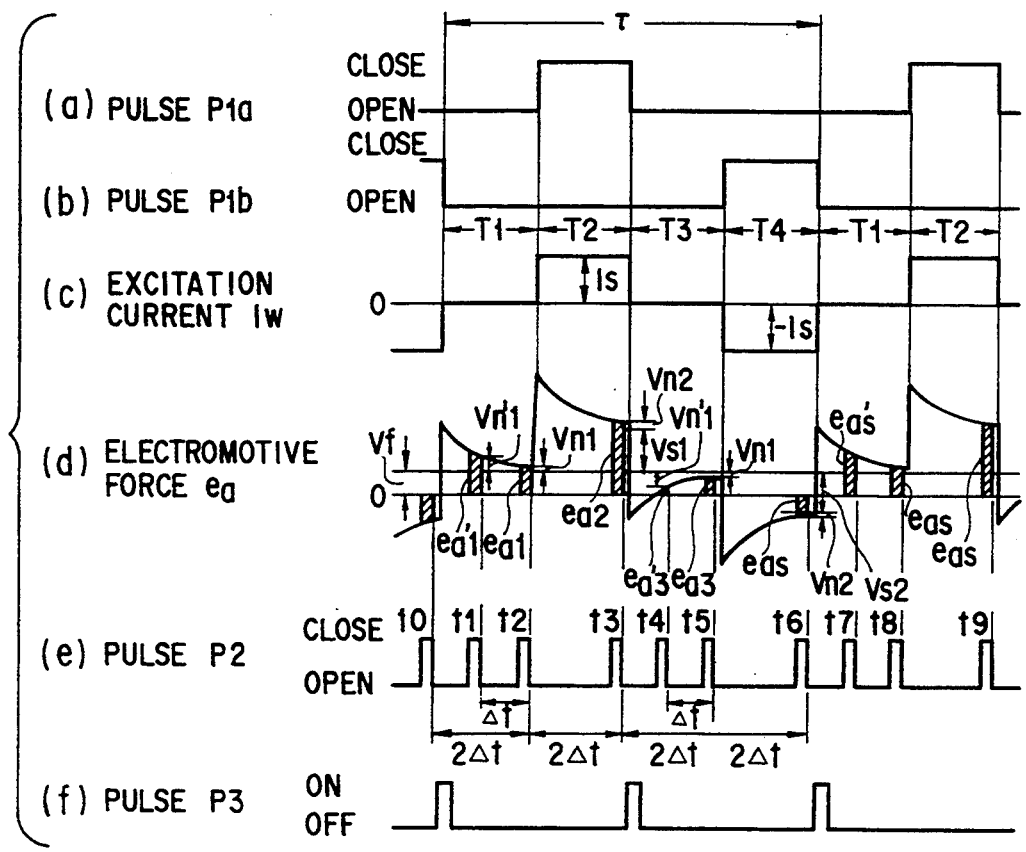
FIG. 11 is a timing diagram for use in explanation of the operation of the conventional flowmeter of FIG. 10, more specifically.

FIG. 8 illustrates an arrangement of an electromagnetic flowmeter of the seventh embodiment, and FIG. 9 is a timing diagram illustrating its operation. In these figures, like reference numerals are used to denote corresponding parts to those in FIGS. 1 and 2 and their descriptions are omitted. Here, only different portions will be described.

To ensure measurement precision, the electromagnetic flowmeter of the seventh embodiment selects between linear-approximation-based extrapolation and parabola-based extrapolation, depending on the magnitude of the induced noise contained in flow-rate signals. As opposed to the device shown in FIG. 1, to the excitation change-over switch 26c in the excitation circuit 26 is connected one end of a resistor 50 the other end of which is connected to an excitation current detect line 51. The sampling switch 28 is allowed by the signal processing timing control circuit 31 to connect to the other end of the detect line 51 connected to the excitation circuit 26 or the output of the preamplifier 27.

Suppose now that the excitation circuit 26 provides excitation currents as shown at (g) in FIG. 9, and electromotive force is thus generated between the electrodes 23 as shown at (i) in FIG. 9.

The preamplifier 27 amplifies this electromotive force and sends the amplified signal to the sampling switch 28.

The signal processing circuit 31 provides timing signals to the sampling switch 28 as shown at (k) in FIG. 9, connecting the output of the preamplifier 27 to the sample and hold circuit, thereby sampling the amplified electromotive force signal at times, when the electromotive force is stable, immediately prior to the switching of the polarity of the excitation current as described previously.

At the time of switching of the polarity of the excitation current, the signal processing timing control circuit 31 controls the excitation current change-over switch 26c in the excitation circuit 26 to change the polarity of the excitation current and at the same time connects the sampling switch 28 to the excitation current detect line 51 at a preselected rise time Ts as shown at (t) in FIG. 9. After the rise time Ts, the signal processing timing control circuit 31 disconnects the sampling switch 28 from the excitation current detect line 51. Thereby, the signal processing timing control circuit 31 samples the excitation current for the rise time Ts immediately after the excitation current polarity has been switched and obtains an excitation current value through the A/D converter 30 as shown at (u) in FIG. 9.

Subsequently, the signal processing timing control circuit 31 compares the excitation current value with a predetermined reference value to thereby decide whether or not the excitation current has exceeded the reference value within the rise time Ts. If the excitation current has risen beyond the reference value within the rise time Ts, the effect of the induced noise is small; otherwise it is great.

If the decision is that the excitation current has risen beyond the reference value, then the signal processing timing control circuit 31 will perform linear-approximation-based extrapolation on the flow-rate signals for long and short excitation cycles to obtain the true flow-rate value v, which, in turn, is sent to the output circuit 32. On the other hand, if the decision is that the excitation current has not risen beyond the reference value, then the signal processing timing control circuit 31 will perform parabola-based extrapolation. In this case as well, the obtained true flow-rate value V is sent to the output circuit 32. The output circuit 32 provides the true flow-rate value V to the recorder not shown.

According to the sixth embodiment, as described above, the signal processing timing control circuit 31 decides how the excitation current rises at the time of switching of the excitation current polarity to examine the effect of the induced noise and switches between the linear-approximation-based extrapolation and the parabola-based extrapolation for obtaining the true flow-rate value V, depending on the effects of the induced noise. This permits more accurate flow-rate measurement to be made without being affected by the induced noise.

The excitation current is sampled after the detection of the electromotive force amplified signal. This saves the need of an additional A/D converter, which permits the flowmeter to be simple in construction.

The second embodiment was described as changing the excitation frequency in three steps. Of course, the excitation frequency may be changed in more than three steps.

The third embodiment was described as substituting the average values of the primary flow-rate signals into the operation expressions to obtain a flow-rate signal. Instead, individual primary flow-rate signals may be substituted into the operation expressions.

Moreover, the sixth embodiment was described as obtaining equation (3)' from equations (1)' and (2)' and obtaining the true flow-rate value V on the basis of equation (3)'. Alternatively, the sixth embodiment may be modified to obtain equation (6)' indicated below from equations (1)' and (2)' and obtain the true flow-rate value V in accordance with the equation $$V = SL \times fH^2/(fH^2 - fL^2) - SH \times fL^2/(fH^2 - fL^2) \qquad (6)'$$

Furthermore, the seventh embodiment was described as detecting the effects of induced noise on the basis of excitation current values in the preselected rise time Ts and selecting between different extrapolation schemes accordingly. Alternatively, the seventh embodiment may be modified to detect the effects of induced noise on the basis of a rise time required for the excitation current to arrive at a predetermined value and select between extrapolation schemes accordingly. In such a case, if that rise time is long, then the parabola-based extrapolation will be performed because the magnitude of induced noise is great. If the rise time is short, on the other hand, then the linear-approximation-based extrapolation will be performed because the magnitude of induced noise is small.

The present invention may be practiced or embodied in still other ways without departing from the scope and spirit thereof.

What is claimed is:

1. An electromagnetic flowmeter comprising:
   a measurement tube through which a fluid flows the rate of flow of which is to be measured;
   a plurality of electrodes disposed on the inner wall of said measurement tube to face each other;
   excitation coils for applying a magnetic field to the inside of said measurement tube in a direction orthogonal to the axis of the tube;
   excitation means for supplying said excitation coils with a rectangular excitation current in at least two excitation cycles;
   flow-rate value calculating means for extrapolating, when electromotive force is generated between said electrodes in each of said excitation cycles, from flow-rate signals corresponding to said electromotive force a flow-rate value signal corresponding to when said excitation cycles are made infinitely long; and
   flow-rate value outputting means for outputting said flow-rate value signal obtained by said flow-rate value calculating means through extrapolation.

2. The electromagnetic flowmeter according to claim 1, wherein said flow-rate value calculating means performs extrapolation arithmetic based on a linear function of excitation cycle.

3. The electromagnetic flowmeter according to claim 1, wherein said rectangular current is selectively switched among three excitation cycles, and wherein said flow-rate value calculating means obtains a flow-rate value signal from flow-rate signals for said three excitation cycles.

4. The electromagnetic flowmeter according to claim 1, wherein said rectangular current is selectively switched between a first excitation frequency fH and a second excitation frequency fL, and wherein said flow-rate value calculating means obtains the average SHa of first flow-rate signals SH for said first excitation frequency fH detected through said electrodes and the average SLa of second flow-rate signals SL for said second excitation frequency fL detected through said electrodes, said flow-rate value calculating means subsequently calculating $$V=(SLa-SHa)\times fH/(fH-fL)+SH$$

upon reception of a first flow-rate signal, or $$V=(SLa-SHa)\times fL/(fH-fL)+SL$$

upon reception of a second flow-rate signal.

5. The electromagnetic flowmeter according to claim 1, wherein said rectangular current is selectively switched between a first excitation frequency fH and a second excitation frequency fL, and wherein upon detecting a first flow-rate signal SH for said first excitation frequency fH through said electrodes and a second flow-rate signal SL for said second excitation frequency fL through said electrodes, said flow-rate value calculating means calculates $$V=SL\times fH/(fH-fL)-SH\times fL/(fH-fL)$$

6. The electromagnetic flowmeter according to claim 5, wherein said flow-rate value calculating means comprises an operational amplifier having an inverting input terminal, a non-inverting input terminal, and an output terminal, a resistor ra for connecting said first flow-rate signal SH to said inverting input terminal, a resistor rb for connecting said inverting input terminal to said output terminal, a resistor rc for connecting said second flow-rate signal SL to said non-inverting input terminal, and a resistor rd for connecting said non-inverting input terminal to ground, said resistors ra, rb, rc and rd being selected to satisfy $$fH/(fH - fL) = \left(1 + \frac{rb}{ra}\right)\frac{rd}{rc + rd}$$

$$fL/(fH - fL) = rb/ra.$$

7. The electromagnetic flowmeter according to claim 1, wherein said flow-rate value calculating means performs extrapolation arithmetic based on a quadratic function of excitation cycle.

8. The electromagnetic flowmeter according to claim 1, wherein said rectangular current is selectively switched between a first excitation frequency fH and a second excitation frequency fL, and wherein said flow-rate value calculating means obtains the average SHa of first flow-rate signals SH for said first excitation frequency fH detected through said electrodes and the average SLa of second flow-rate signals SL for said second excitation frequency fL detected through said electrodes, said flow-rate value calculating means subsequently calculating $$V=(SLa-SHa)\times fH^2/(fH^2-fL^2)+SH$$

upon reception of a first flow-rate signal, or $$V=(SLa-SHa)\times fL^2/(fH^2-fL^2)+SL$$

upon reception of a second flow-rate signal.

9. The electromagnetic flowmeter according to claim 1, wherein said rectangular current is selectively switched between a first excitation frequency fH and a second excitation frequency fL, and wherein upon detecting a first flow-rate signal SH for said first excitation frequency fH through said electrodes and a second flow-rate signal SL for said second excitation frequency fL through said electrodes, said flow-rate value calculating means calculates $$V=SL\times fH^2/(fH^2-fL^2)-SH\times fL^2/(fH^2-fL^2).$$

10. An electromagnetic flowmeter comprising:
    a measurement tube through which a fluid flows the rate of flow of which is to be measured;
    a plurality of electrodes disposed on the inner wall of said measurement tube to face each other;

excitation coils for applying a magnetic field to the inside of said measurement tube in a direction orthogonal to the axis of the tube;

excitation means for supplying said excitation coils with a rectangular excitation current that is selectively switched between at least two excitation cycles;

flow-rate signal producing means responsive to electromotive force induced in said fluid and detected by said electrodes for producing a flow-rate signal for each of said excitation cycles;

excitation current detecting means for detecting said excitation current flowing through said excitation coils at a preselected rise time;

flow-rate value calculating means for making a comparison between an excitation current detected by said excitation current detecting means and a predetermined reference current value to decide whether or not said excitation current has reached said predetermined reference current value at said rise time, and obtaining a flow-rate value signal that corresponding to when said excitation cycle is made infinitely long from flow-rate signals produced by said flow-rate signal producing means by means of an extrapolation based on one of a linear function of excitation cycle when the decision is that said excitation current has reached said reference current value and a quadratic function of excitation cycle when the decision is that said excitation current has not reached said reference current value; and flow-rate value outputting means for outputting said flow-rate value signal obtained by said flow-rate value calculating means.

11. A method of electromagnetically measuring the rate of flow of a fluid by use of an electromagnetic flowmeter having a measurement tube through which a fluid flows the rate of flow of which is to be measured, a plurality of electrodes disposed on the inner wall of said measurement tube to face each other, and excitation coils for applying a magnetic field to the inside of said measurement tube in a direction orthogonal to the axis of the tube, said method comprising the steps of:

exciting said excitation coils;

supplying said excitation coils with a rectangular excitation current that is selectively switched between at least two excitation cycles;

calculating a flow-rate value signal corresponding to when said excitation cycles are made infinitely long from flow-rate signals for the respective excitation cycles obtained by detecting electromotive force induced in said fluid by electrodes by means of extrapolation of said flow-rate signals; and outputting said flow-rate value signal.

12. The method according to claim 11, wherein said extrapolation is based on a linear function of excitation cycle.

13. The method according to claim 11, wherein said rectangular excitation current is switched among three excitation cycles, and wherein said calculating step obtains said flow-rate value signal from flow-rate signals corresponding to said three excitation cycles.

14. The method according to claim 11, wherein said rectangular excitation current is switched between a first frequency fH and a second frequency fL, and wherein said calculating step includes the substeps of:

obtaining the average SHa of first flow-rate signals SH for said first frequency fH detected by said electrodes and the average SLa of second flow-rate signals SL for said second frequency detected by said electrodes; and subsequently calculating:

$$V = (SLa - SHa) \times fH/(fH - fL) + SH$$

upon reception of a first flow-rate signal, or $$V = (SLa - SHa) \times fL/(fH - fL) + SL$$

upon reception of a second flow-rate signal.

15. The method according to claim 11, wherein said rectangular current is selectively switched between a first excitation frequency fH and a second excitation frequency fL, and wherein said calculating step calculates, on the basis of a first flow-rate signal SH for said first excitation frequency fH detected through said electrodes and a second flow-rate signal SL for said second excitation frequency fL detected through said electrodes, $$V = (SL \times fH - SH \times fL)/(fH \times fL)$$

16. The method according to claim 11, wherein in said calculating step, extrapolation arithmetic based on a quadratic function of excitation cycle is performed.

17. The method according to claim 11, wherein said rectangular excitation current is switched between a first frequency fH and a second frequency fL, and wherein said calculating step includes the substeps of:

obtaining the average SHa of first flow-rate signals SH for said first frequency fH detected by said electrodes and the average SLa of second flow-rate signals SL for said second frequency detected by said electrodes; and subsequently calculating:

$$V = (SLa - SHa) \times fH^2/(fH^2 - fL^2) + SH$$

upon reception of a first flow-rate signal, or $$V = (SLa - SHa) \times fL^2/(fH^2 - fL^2) + SL$$

upon reception of a second flow-rate signal.

18. The method according to claim 11, wherein said rectangular current is selectively switched between a first excitation frequency fH and a second excitation frequency fL, and wherein said calculating step calculates, on the basis of a first flow-rate signal SH for said first excitation frequency fH detected through said electrodes and a second flow-rate signal SL for said second excitation frequency fL detected through said electrodes, $$V = SL \times fH^2/(fH^2 - fL^2) - SH \times fL^2/(fH^2 - fL^2).$$

19. A method of electromagnetically measuring the rate of flow of a fluid by use of an electromagnetic flowmeter having a measurement tube through which a fluid flows the rate of flow of which is to be measured, a plurality of electrodes disposed on the inner wall of said measurement tube to face each other, and excitation coils for applying a magnetic field to the inside of said measurement tube in a direction orthogonal to the axis of the tube, said method comprising the steps of:

exciting said excitation coils;

supplying said excitation coils with a rectangular excitation current that is selectively switched between at least two excitation cycles;

producing a flow-rate signal for each of said excitation cycles on the basis of electromotive force induced in said fluid;

detecting said excitation current flowing through said excitation coils at a preselected rise time;

comparing an excitation current detected by said excitation current detecting step and a predetermined reference current value and making a decision whether said excitation current has reached said predetermined reference current value at said rise time;

calculating a flow-rate value signal corresponding to when said excitation cycle is made infinitely long from flow-rate signals produced by said flow-rate signal producing step by means of an extrapolation based on one of a linear function of excitation cycle when the decision is that said excitation current has reached said reference current value and a quadratic function of excitation cycle when the decision is that said excitation current has not reached said reference current value; and outputting said flow-rate value signal obtained by said flow-rate value calculating step.

* * * * *